Dec. 26, 1950     A. J. POPPIE     2,535,598
SUGAR BEET PICKUP MACHINE
Filed Feb. 6, 1948     3 Sheets-Sheet 1

Alfred J. Poppie
INVENTOR.

Dec. 26, 1950   A. J. POPPIE   2,535,598
SUGAR BEET PICKUP MACHINE
Filed Feb. 6, 1948   3 Sheets-Sheet 2
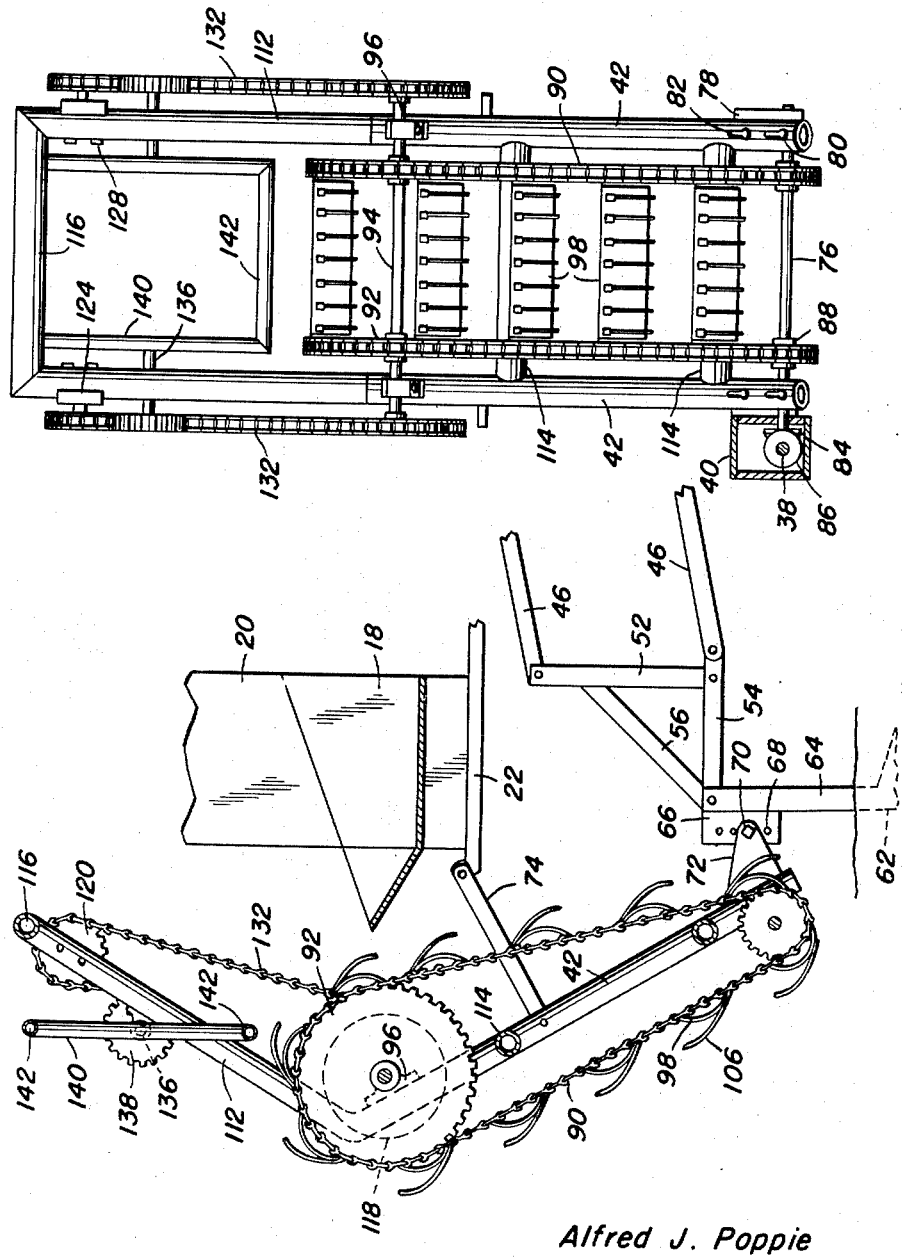
Alfred J. Poppie
INVENTOR.

Dec. 26, 1950  A. J. POPPIE  2,535,598
SUGAR BEET PICKUP MACHINE
Filed Feb. 6, 1948  3 Sheets-Sheet 3
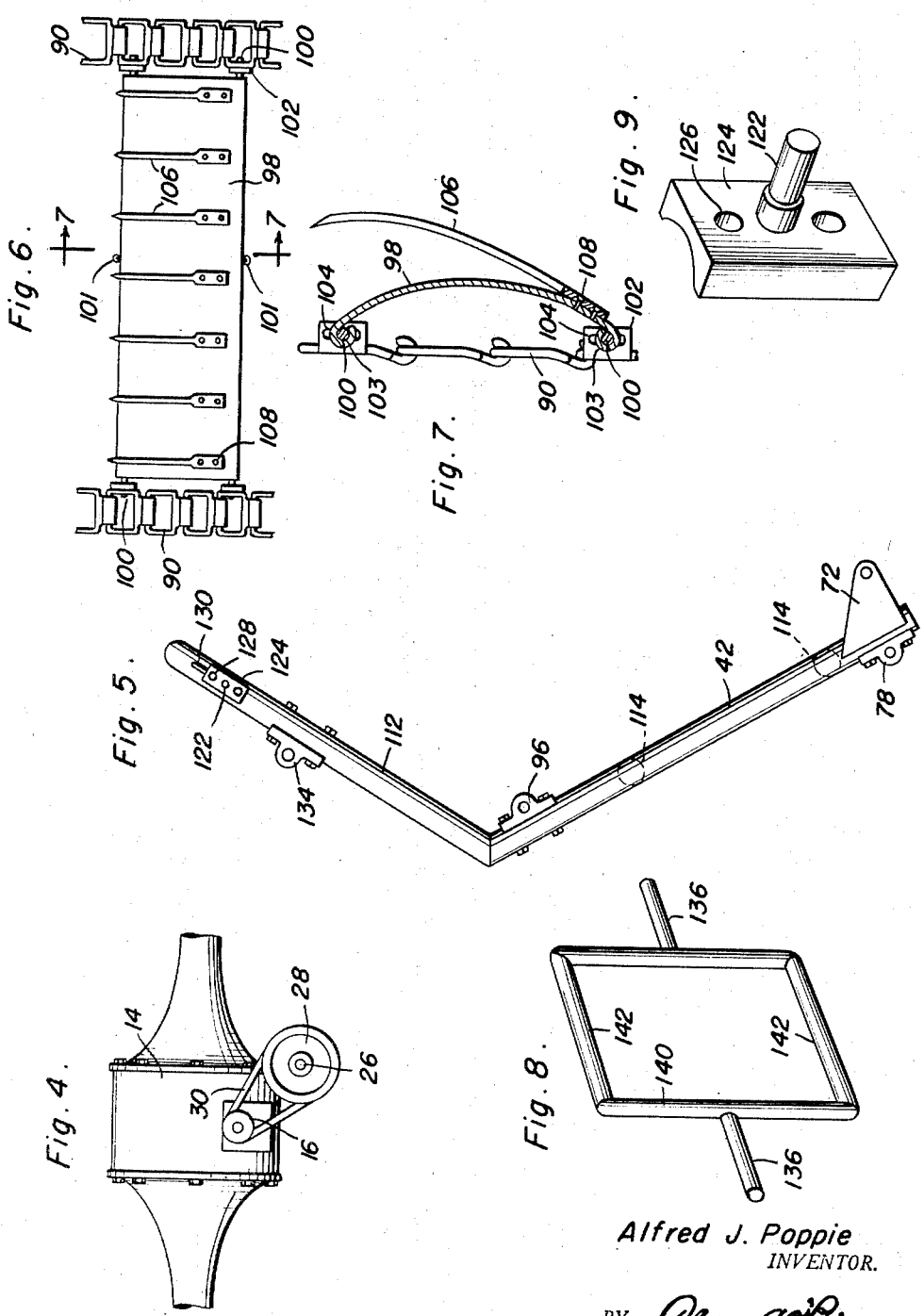
Alfred J. Poppie
INVENTOR.

Patented Dec. 26, 1950

2,535,598

UNITED STATES PATENT OFFICE 2,535,598

SUGAR BEET PICKUP MACHINE

Alfred J. Poppie, San Francisco, Calif., assignor of one-fifteenth to Wilford G. Poppie, one-fifteenth to John H. Poppie, both of Victor, Mont., one-fifteenth to Mary D. Kellogg, and two-fifteenths to Ruth F. Poppie, both of San Francisco, Calif.

Application February 6, 1948, Serial No. 6,592

6 Claims. (Cl. 55—51)

This invention relates generally to harvester machines, and more particularly to a sugar beet harvesting machine for use with a tractor having a power take-off, and a hopper.

A primary object of this invention is to provide a beet harvesting machine which may be used with many types of tractors, the machine having means adapting the same for accurate vertical adjustment with reference to the frame of the tractor, so that the machine may be properly positioned according to varying conditions, such as the size of the beets and the nature of the ground in the field of beets being harvested.

Another object of this invention is to provide improved beet engaging means in which a curved plate and curved beet impaling hook structure is employed, this structure providing for effective withdrawal of the beets from the ground, without undue mutilation of the beets.

Still another object of this invention is to combine with an endless elevator for the beets, a knocker which rotates at the upper end of the elevator and forcefully disengages the beets from the above mentioned beet impaling hooks, the harvested beets being knocked into a hopper of conventional character.

Yet another object of this invention is to provide a beet harvesting machine comprised of a minimum number of parts, light in weight, easily mounted and adjusted on a tractor, and as easily removed therefrom, all without modification of the tractor.

And a last object to be mentioned specifically is to provide a sugar beet harvesting machine which is relatively inexpensive and practicable to manufacture, which is extremely simple and very safe to operate, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 2 is an enlarged vertical sectional view of the structure shown in the left-hand side of Figure 1;

Figure 3 is a front elevational view of the main portions of the frame, the endless elevator and knocker, together with power transmission means therefor, the connection of the lower shaft with the power take-off means of the tractor being somewhat diagrammatically illustrated by bevel gears enclosed in a gear casing shown in vertical section;

Figure 4 is a fragmentary enlarged detail view, of a portion of the rear axle housing and power take-off means, the figure being vertical sectional in character and taken on the line 4—4 in Figure 1;

Figure 5 is a side elevational view of a main portion of the frame structure;

Figure 6 is an enlarged fragmentary detail view showing a single plate and contiguous portions of the endless elevator;

Figure 7 is a still further enlarged view, vertical sectional in character and taken on a transverse plane through the line 7—7 in Figure 6;

Figure 8 is a three dimensional view of the knocker; and

Figure 9 is a three dimensional view of one of the adjustable journal members used to mount the idler sprocket wheels on the upper end of the frame structure illustrated in Figure 5.

Similar characters of reference designate similar or identical elements and portions throughout the specification and throughout the several views of the drawings.

Figure 1:
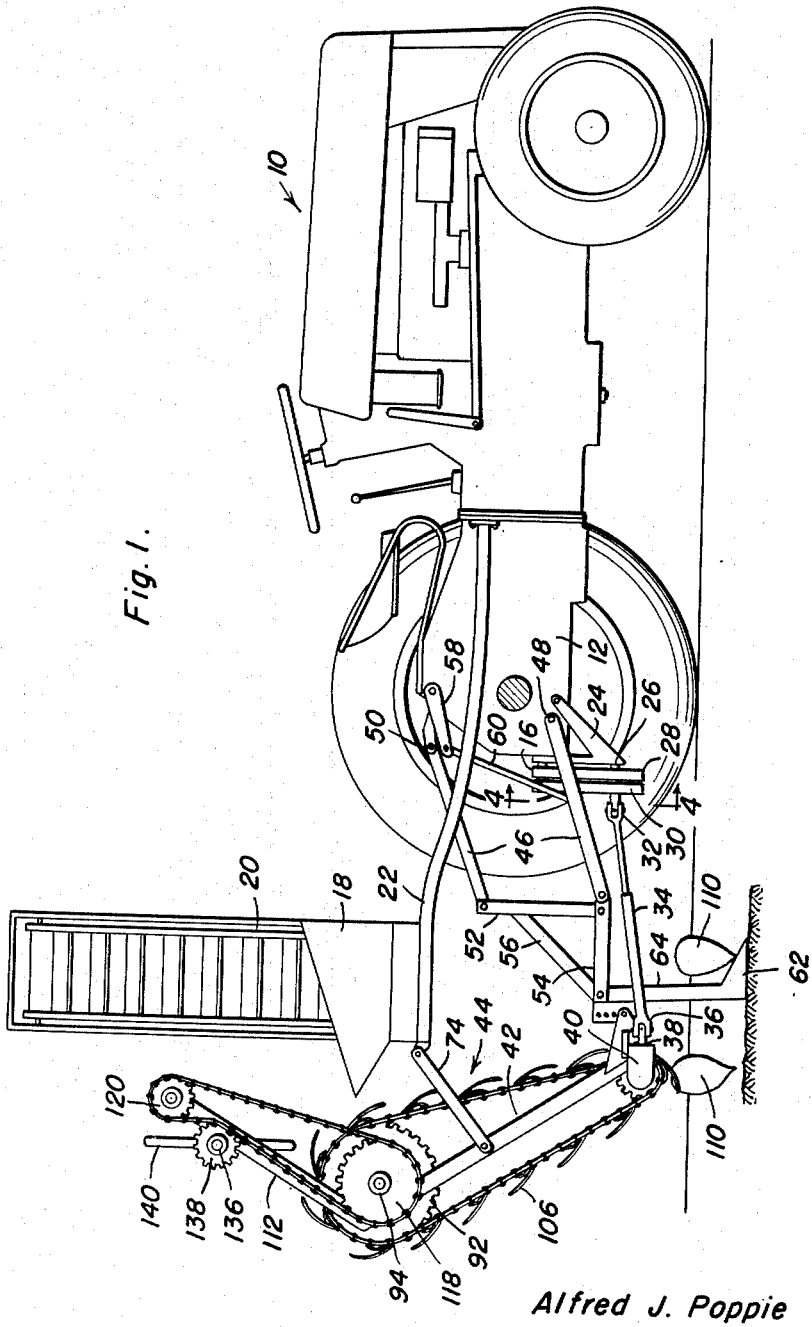
Figure 1 is a side elevational view of a tractor with a hopper and this invention operatively applied thereto.

Referring now to the drawings in detail, the environment wherewith this invention is adapted to be used includes a tractor generally indicated by the numeral 10 and having a frame 12, a rear axle housing 14 and a power take-off mechanism including a double pulley 16. This environment will also include a hopper 18 of conventional design and ordinarily associated with an elevator 20, mounted in any suitable manner as indicated by supporting frame structure 22, and it will be understood that the specific construction of the foregoing parts is not thought of as material in this application.

This invention contemplates provision of suitable bracket supports 24 for a shaft 26 to be driven by a pair of pulleys 28 mounted on this shaft and associated with belts 30 entrained upon the power take-off pulleys 16. The rear end of the shaft 26 is provided with a universal joint 32 and an extensible drive shaft 34 is connected by means of another universal joint 36 to a short drive shaft 38. This last mentioned short drive shaft 38 is mounted in suitable bearings and within a gear casing 40 on the lower end of one of the parallel frame members 42, the latter carrying an endless elevator generally indicated by the numeral 44.

The frame of this beet harvesting machine must be made vertically adjustable and a preferred means of accomplishing this vertical adjustment is illustrated as including a pair of parallel bars 46 terminally pivoted as at 48 and 50 on the frame 12 and having the rear ends thereof pivoted on a sub-frame member comprised of vertical lateral bars 52, horizontal rearwardly extending bars 54 and inclined brace bars 56, this sub-frame extending transversely of the tractor and behind the same. The tractor 10 will ordinarily be equipped with hoist means and this hoist means, generally indicated by the numeral 58, is connected to the parallel bar structure as by an inflexible link or links 60, whereby the said sub-frame may be raised and lowered relative to the frame 12 of the tractor.

A double bladed sub-surface hoe 62 of conventional design is carried by subtending arms 64 rigidly mounted on the sub-frame, and this hoe 62 is used to loosen beets from the ground.

The said sub-frame is also provided with rearwardly extending plate members 66 which are apertured as indicated at 68 to receive bolts 70 whereby bracket attachment plates 72 rigidly secured to the lower ends of the frame members 42 are adjustably mounted upon these plates 66. Intermediate the ends of the members 42, a pair of inflexible links 74 are terminally secured thereto, the forward and upper ends of these links being secured to any adjacent frame structure such as that indicated at 22.

The endless elevator 44 will now be described. A lower shaft 76 is journalled in adjustable bearings 78 held by bolts 80 in slot 82 in the lower ends of the members 42, and this shaft 76 has rigidly secured thereto a bevel gear 84 which is in continual mesh with a bevel gear 86 carried by the shaft 38. The shaft 76 has a pair of sprocket gears 88 and these sprocket gears drive sprocket chains 90 entrained over larger sprocket wheels 92 carried on the shaft 94 which is positioned in bearings 96 on the upper ends of the members 42. A plurality of plates 98, best illustrated in Figure 6, are each provided with longitudinally extending pins 100 retained by cotter keys 101 within the turned edges 103 and the chains 90 are provided with apertured plates 102 to receive these pins, whereby the plates are carried by the chains. The plates 98 are arched outwardly and these plates are somewhat resilient to allow the plates 98 to flex slightly during operation of the machine, and the plates 102 may be slotted as at 104 so that the pins 100 may move relative to the plates 102 within predetermined limits.

Each of the plates 98 carries a plurality of arched beet impaling hooks 106, it being noted that the hooks and the plates 98 are somewhat similarly arched, that is, they are arched in the same sense, and these hooks 106 are replaceably secured by screws 108 adjacent the edge of the plates 98 which is the trailing edge of the plate when the elevator is in operation. It will be clear that the plates 98 will usually contact the beets 110 and if reference is had to Figure 1, it will be clear how the hooks 106 impale the beets and elevate the same along the rear side of the endless elevator 44.

The frame members 42 preferably are inclined rearwardly and extending frame members 112 are rigidly secured to the upper ends of the frame members 42, the extending frame members 112 being inclined forwardly and upwardly, so as to bring intermediate portions of these extending members 112 slightly forward of the shaft 94. The frame members 42 are connected by transverse braces 114 and the upper ends of the extending frame members 112 are connected by a transverse top brace member 116. Sprocket wheels 118 are connected terminally on the shaft 94 and idler sprocket wheels 120 are mounted on adjustable journal members 122, best illustrated in Figure 9, having attachment plates 124 apertured as at 126 to receive bolts 128 which are inserted through slots 130 shown in Figure 5 in the upper end portion of the extending frame members 112. The sprocket wheels 120 and 118 are operatively linked by the chains 132 and bearings 134 are mounted intermediate the ends of these extending frame members 112 in a knocker comprised of short stub axle members 136 mounted in the bearings 134 and having sprocket wheels 138 engaging the chains 132, lateral spacer bars 140 rigidly secured to the inner ends of the stub axle members 136 and a pair of rigid bars 142 terminally secured to the spacer bars 140 and disposed transversely of the machine and between the extending frame members 112, is thus adapted to knock beets 110 from the beet impaling hooks 106 as these hooks reach the top of the endless elevator 44, the beets being knocked into the hopper 18. It is preferred that the proportioning of the various sprocket wheels and chains be such that one of the inflexible bars 142 of the knocker will traverse the top of the endless conveyor 44 each time a plate 98 with its hooks 106 reaches the top of the elevator, and it is also preferred that the knocker shall rotate at a speed sufficient to strike the beets with sufficient force to drive the same positively from the hooks 106 into the hopper 18.

The operation of this invention will be clearly understood from the foregoing description of the mechanical details thereof, taken in connection with the above recitation of the objects sought to be achieved by this invention. It is clear that the structure described will amply accomplish the recited objects and it will also now be evident that this machine may be adapted to harvest several rows of beets at one time and that the knocker will tend to knock the earth from these beets so that the beets on reaching the hopper 18 are reasonably clear of soil originally clinging thereto. It will also be evident that this machine will not pick up rocks or other material not capable of being impaled by the hooks 106. The above description would seem to be sufficient to allow others to make and to use this invention and further description is, therefore, deemed unnecessary.

Many minor variations may be made in the details of construction and the proportionment of the various elements of this invention all without departure from the spirit and scope thereof, and the scope of this invention should be determined according to a proper interpretation of the subjoined claims.

Having described the invention, what is claimed as new is:

1. A sugar beet harvesting machine for use with a tractor having a power take-off and a hopper, comprising a frame securable to a tractor, an endless elevator operably mounted on said frame and driven by said power take-off, beet engaging means carried by said elevator, a rotating knocker operatively mounted on said frame to knock the beets from said means into said hopper, said frame including a pair of nearly upright members, and said knocker including a pair of bars spaced equally from and carried by a shaft mounted transversely of and between said upright members.

2. A sugar beet harvesting machine for use with a tractor having a power take-off and a hopper, comprising a frame securable to a tractor, an endless elevator operably mounted on said frame and driven by said power take-off, a plurality of spaced plates disposed transversely of and carried by said elevator, a plurality of transversely spaced beet impaling hooks carried by each of said plates, and a rotating knocker operatively mounted on said frame to knock the beets from said hooks.

3. A sugar beet harvesting machine for use with a tractor having a power take-off and a hopper, comprising a frame securable to a tractor, an endless elevator operably mounted on said frame and driven by said power take-off, a plurality of spaced plates disposed transversely of and carried by said elevator, a plurality of transversely spaced beet impaling hooks carried by each of said plates, said hooks being each arched relative to said plates, and a rotating knocker operatively mounted on said frame to knock the beets from said hooks.

4. A sugar beet harvesting machine for use with a tractor having a power take-off and a hopper, comprising a frame securable to a tractor, an endless elevator operably mounted on said frame and driven by said power-take-off, a plurality of spaced plates disposed transversely of and carried by said elevator, and a plurality of transversely spaced beet impaling hooks carried by each of said plates, said plates and hooks being each arched outwardly, said plates being resilient, and a rotating knocker operatively mounted on said frame to knock the beets from said hooks.

5. A sugar beet harvesting machine for use with a tractor having a power take-off and a hopper, comprising a frame secureable to a tractor, an endless elevator operably mounted on said frame and driven by said power take-off, a plurality of spaced plates disposed transversely of and carried by said elevator, and a plurality of transversely spaced beet impaling hooks carried by each of said plates, said plates and hooks being each arched said plates being resilient and said hooks being secured to the plates adjacent the trailing edges of the plates when the elevator is in operation, and a rotating knocker operatively mounted on said frame to knock the beets from said hooks.

6. A machine according to claim 3 and wherein said elevator includes a pair of endless lateral chains, said plates being secured at two spaced points to said chains.

ALFRED J. POPPIE.

REFERENCES CITED

The following references are of record in the file of this patent:

UNITED STATES PATENTS

| Number | Name | Date |
| --- | --- | --- |
| 2,093,148 | Hoofnagle | Sept. 14, 1937 |
| 2,172,507 | Grignolo | Sept. 12, 1939 |
| 2,428,904 | Zuckerman | Oct. 14, 1947 |

FOREIGN PATENTS

| Number | Country | Date |
| --- | --- | --- |
| 9,227 | Sweden | Sept. 17, 1898 |
| 137,468 | Great Britain | Jan. 15, 1920 |
| 40,792 | Denmark | Sept. 16, 1929 |